United States Patent [19]

Ogawa

[11] Patent Number: 5,188,152
[45] Date of Patent: Feb. 23, 1993

[54] TUBULAR STRUCTURES FOR FISHING RODS OR THE LIKE

[75] Inventor: Kazunobu Ogawa, Tokyo, Japan

[73] Assignee: Ryobi Ltd., Hiroshima, Japan

[21] Appl. No.: 451,974

[22] Filed: Dec. 20, 1989

Related U.S. Application Data

[63] Continuation-in-part of Ser. No. 152,388, Feb. 4, 1988, abandoned.

[30] Foreign Application Priority Data

Feb. 5, 1987 [JP] Japan .............................. 62-16367[U]

[51] Int. Cl.$^5$ ................................................ F16L 9/16
[52] U.S. Cl. ...................................... 138/129; 138/127;
  138/130; 138/144; 138/141; 138/172; 138/174;
  43/18.5
[58] Field of Search ............... 138/153, 144, 141, 149,
  138/172, 174, 143, 129, 130, 127; 43/18.5

[56] References Cited

U.S. PATENT DOCUMENTS

| | | | |
|---|---|---|---|
| 3,091,262 | 5/1963 | Donaldson | 138/143 |
| 3,166,319 | 1/1965 | Brilhart | 138/143 |
| 3,189,054 | 6/1965 | Rucks et al. | 138/143 |
| 4,131,701 | 12/1978 | Van Auken | 138/143 |
| 4,200,126 | 4/1980 | Fish | 138/143 |

FOREIGN PATENT DOCUMENTS 63-71524 3/1988 Japan .

*Primary Examiner*—James E. Bryant, III
*Attorney, Agent, or Firm*—Finnegan, Henderson, Farabow, Garrett and Dunner

[57] ABSTRACT

In a tubular structure for forming a fishing rod, an amorphous metal long fiber tape is spirally or crosswise wound on a prepreg sheet tube with a predetermined pitch, not being overlapped in each turn, so that the prepreg sheet and the amorphous long fiber tape are joined together with high adherence, whereby its twisting strength, collapsing strength and bending strength are improved.

9 Claims, 4 Drawing Sheets

TUBULAR STRUCTURES FOR FISHING RODS OR THE LIKE

BACKGROUND OF THE INVENTION

This application is a continuation-in-part of application Ser. No. 07/152 388 filed Feb. 4, 1988, now abandoned.

This invention relates to a tubular structure for use in manufacturing for instance, fishing rods or golf shafts.

In one example of a tubular structure for manufacturing fishing rods or the like, as disclosed by Japanese Patent Application (OPI) No. 41532/1986 (the term "OPI" as used herein means an "unexamined published application"), a tube is formed by winding a prepreg sheet in such a manner as to form inner and outer prepreg sheet layers, and a single fiber of amorphous alloy is spirally or crosswise wound in such a manner as to be interposed between the inner and outer prepreg sheet layers. In another example, as disclosed by Japanese Patent Application (OPI) No. 189369/1982 tubular reinforced resin layer of high strength fibers such as carbon fibers and synthetic resin is combined with a tubular alloy layer made up of an amorphous alloy thin plate.

In the first example described above, the amorphous single fiber employed is linear, and is therefore brought into point contact with the prepreg sheet. Accordingly, the load applied thereto is concentrated; that is, winding tension in the amorphous single fiber is low.

When a fishing rod is bent, it becomes elliptic in transverse cross-section. In this case, the linear amorphous single fiber, being in point contact with the prepreg sheet, penetrates the latter in the direction of the major diameter, thus reducing the strength of the fiber wound portion of the fishing rod. Accordingly, in the fiber wound portion of the fishing rod, it is not satisfactory to wind the fiber on the prepreg sheet under high tension. As a result, the adhesion of the fiber thus wound to the prepreg sheet is low, and accordingly the inner and outer layers are subject to peeling off from each other.

In the second example of the conventional tubular structure, the amorphous alloy thin plate is spirally wound on the reinforcing resin layer to form the alloy layer. Therefore, the strength (top strength, middle strength and base strength) of the fishing rod is limited. In the case where the alloy layer is formed between the inner and outer layers, these layers are subject to peeling off from each other because they are separated from each other by the alloy layers.

SUMMARY OF THE INVENTION

Accordingly, an object of this invention is to eliminate the above-described difficulties accompanying a conventional tubular structure which is used for manufacturing, for instance, fishing rods.

More specifically, an object of the invention is to provide a tubular structure which is used for manufacturing, for instance, fishing rods which is high in twisting strength collapsing strength, and bending strength.

The foregoing object and other objects of the invention have been achieved by the provision of a tubular structure which, according to the invention, comprises: a tube formed by using a prepreg sheet; and an amorphous metal long fiber formed on the tube by spirally or crosswise winding an amorphous metal long fiber tape on the tube with a predetermined pitch to form an amorphous long fiber layer on the inner wall and/or the outer wall of the tube, or between the prepreg sheet layers of the tube, or on each of the prepreg sheet layers.

The nature, principle and utility of the invention will become more apparent from the following detailed description when read in conjunction with the accompanying drawings.

DETAILED DESCRIPTION OF THE INVENTION

Preferred embodiments of this invention will be described with reference to the accompanying drawings.

Figure 1:
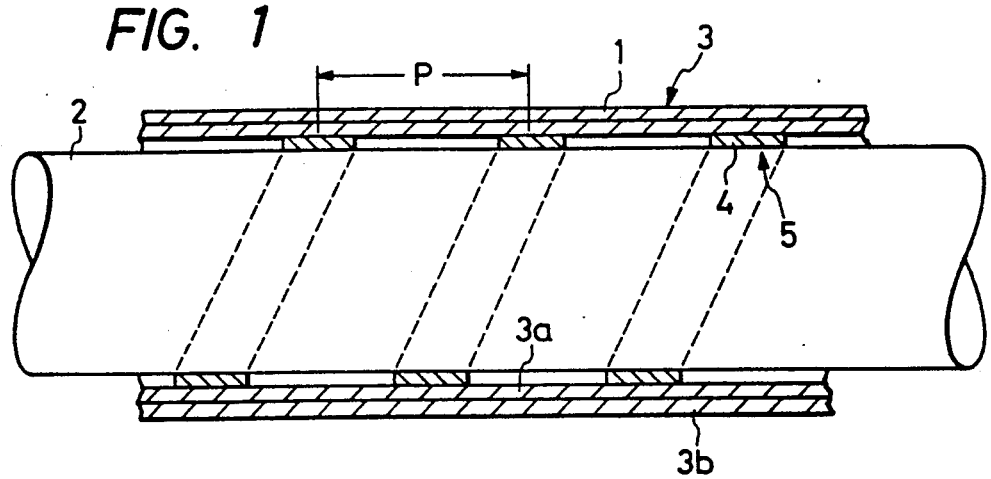
FIGS. 1 through 5 are longitudinal sectional views showing various examples of a tubular structure according to this invention which is used for manufacturing, for instance, fishing rods.
Figure 2:
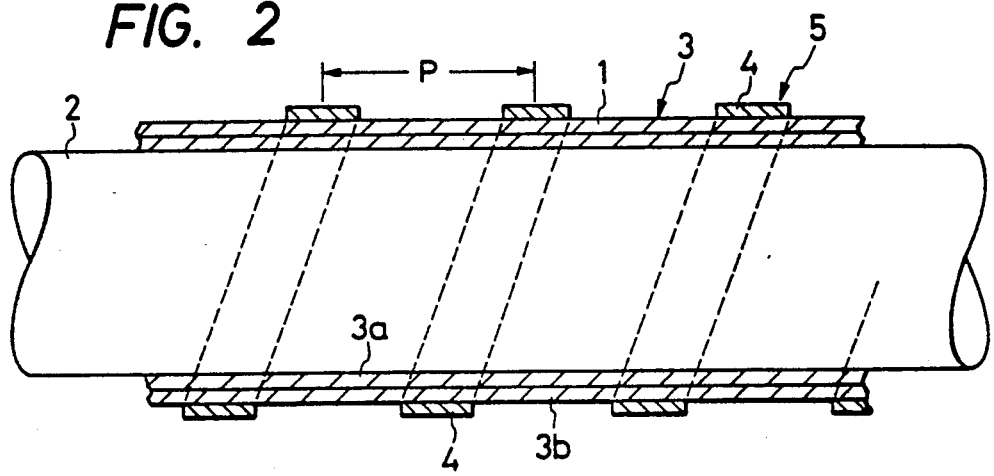
Figure 3:
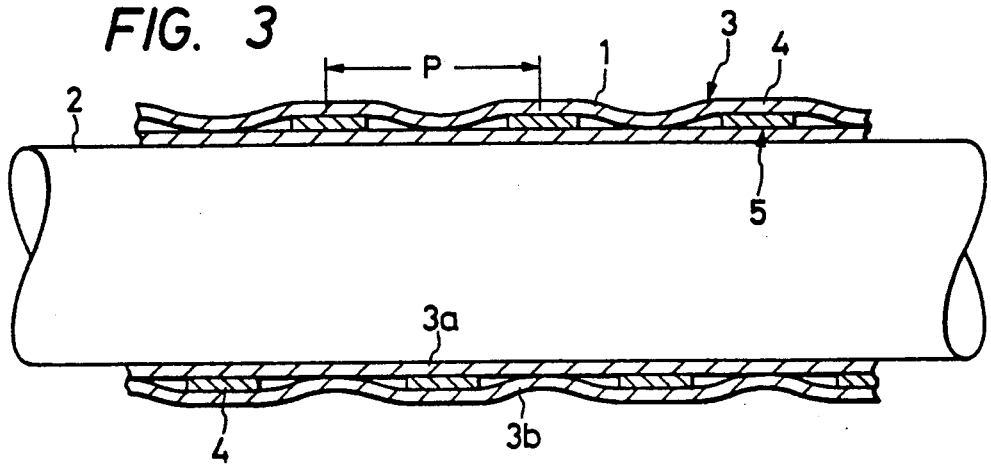
Figure 4:
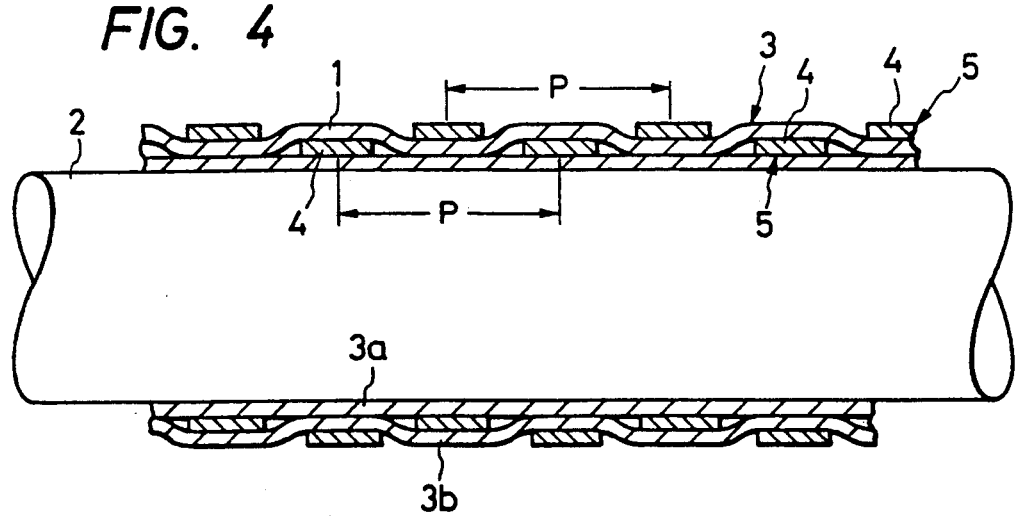
Figure 5:
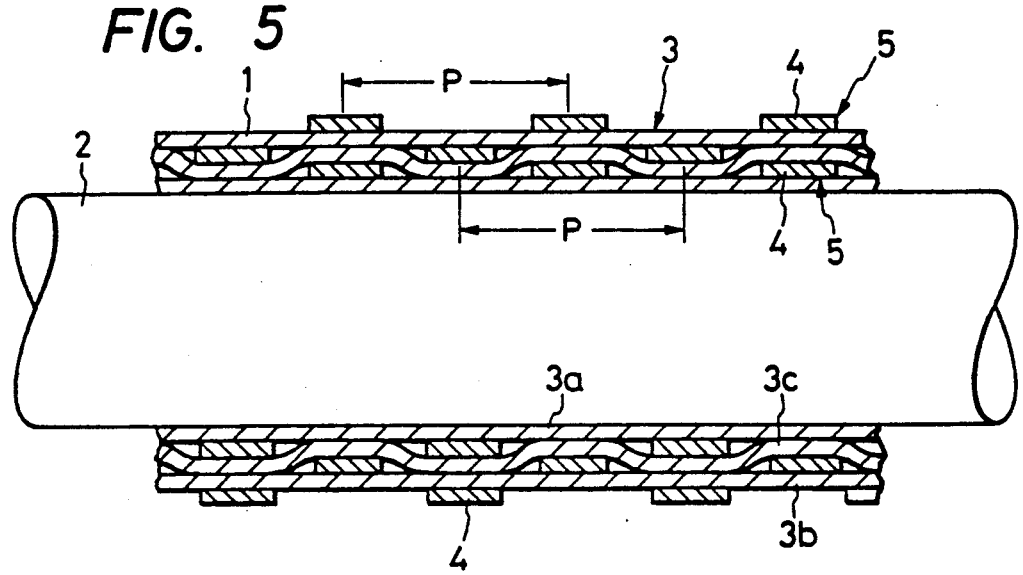

As shown in FIG. 1, 2, 3, 4 and 5, a prepreg sheet 1 is wound on a metal core 2 to form a tube 3 formed of multiple layers 3b, and an amorphous metal long fiber tape 4 is wound on the tube 3 at a predetermined pitch to form an amorphous metal long fiber layer or layers 5. In the case of FIG. 1, the tape 4 is wound on the inner wall of the tube 3; and in the case of FIG. 2, it is wound on the outer wall of the tube 3. In the case of FIG. 3, the tape 4 is wound in such a manner that the amorphous long fiber layer 5 is formed between the inner and outer layers 3a and 3b which form the tube 3. In the case of FIG. 4, the tape 4 is wound in such a manner that one amorphous long fiber layer 5 is provided between the inner and outer layers 3a and 3b of the tube 3 and another long fiber layer 5 is formed on the outer wall of the outer layer 3b. In the case of FIG. 5, the tape 4 is wound in such a manner that first, second and third amorphous long fiber layers 5, 5 and 5 are formed on the inner, middle and outer layers 3a, 3c and 3b which form the tube. In these tubes 3, the amorphous long fiber tape is wound over the entire length thereof or partially only on the middle portion.

The prepreg sheet mentioned above is a sheet which is typically formed by paralleling high strength fibers such as glass fibers or carbon fibers in a thermo-setting resin, or by impregnating a thermo-setting synthetic resin into a woven cloth of such fibers.

The amorphous metal long fiber tape 4 should be wound on the tube of the prepreg sheet 1 with high adherence. For this purpose, depending on the position of the amorphous long fiber tape 4 on the tube 3, one or both sides of the tape are made rougher by shot blasting, liquid honing or metal plating, as compared with the surface of an ordinary amorphous sheet.

In the case of FIG. 1 in which the amorphous long fiber layer 5 is formed on the inner wall of the tube 3, the amorphous metal long fiber tape 4, one side of which is roughened in the above-described manner, is spirally or crosswise wound on the metal core 3, and the prepreg sheet 1 is wound on the tape 4 thus wound, to form, preferably, a plurality of layers of prepreg sheet. Thus, a tubular structure is formed. When necessary, the inner and outer walls of the tubular structure thus formed are protected by coating them.

In the case of FIG. 2 in which the amorphous long fiber layer 5 is formed on the outer wall of the tube, the prepreg sheet 1 is wound on the metal core 2 to form two prepreg sheet layers thereon to thereby form the tube 3, and the amorphous metal long fiber tape 4, one side of which (inner wall) has been roughened, is spirally or crosswise wound on the tube 3 at a predetermined pitch P. Thus, a tubular structure is formed. When necessary, the tubular structure thus formed is subjected to protective coating.

In the case of FIG. 3 in which the amorphous long fiber layer 5 is formed between the inner and outer layers 3a and 3b of the tube, first the prepreg sheet 1 is wound on the metal core 2 to form the inner layer 3a, second the amorphous metal long fiber tape having both sides (inner and outer walls) roughened is spirally or crosswise wound on the inner layer 3a, and finally another prepreg sheet 1 is wound to form the outer layer 3b thereon. Thus, a tubular structure is formed. When necessary, the tubular structure is subjected to protective coating.

As shown in FIGS. 4 and 5 two or three amorphous long fiber layers 5 are formed. First the prepreg sheet 1 is wound on the metal core 2 to form one prepreg sheet layer, namely, the inner layer 3a. Second the amorphous metal long fiber tape 4 having both sides roughened is spirally or crosswise wound on it at a predetermined pitch P, and then another layer of prepreg sheet is wound on it over the tape 4 to form the outer layer 3b in the case of FIG. 4 and the middle layer 3c in the case of FIG. 5. Furthermore, in the case of FIG. 4, a second course of amorphous metal long fiber tape 4 having one side (inner wall) roughened is wound in the same manner over layer 3b, to provide a tubular structure. In the case of FIG. 5, the second course of amorphous metal long fiber tape 4 having both sides (inner and outer walls) roughened is wound in the same manner, and after the prepreg sheet 1 is wound on it to form the outer layer 3b, another course of amorphous metal long fiber tape 4 having one side (inner wall) roughened is wound on it in the same manner, to form a tubular structure. When necessary, these tubular structures thus formed are subjected to protective coating.

As was described above, in the case where two or three amorphous long fiber layers 5 are formed as shown in FIG. 4 or 5, the amorphous long fiber layers 5 are shifted from each other in the axial direction. Therefore, similarly as in the tubular structure shown in FIG. 3, in the portion where no amorphous long fiber tape 4 is provided, the inner layer 3a and the outer layer 3b adhere to each other sufficiently in the case of FIG. 4; and in the case of FIG. 5, the inner layer 3a and the middle layer 3c adhere to each other while the middle layer 3c and the outer layer 3b adhere to each other. Thus, the layers 3a, 5 and 3b, the layers 3a, 5 and 3b, or 3a, 5, 3c, 5, 3b and 5 are joined together with high adherence.

Figure 8:
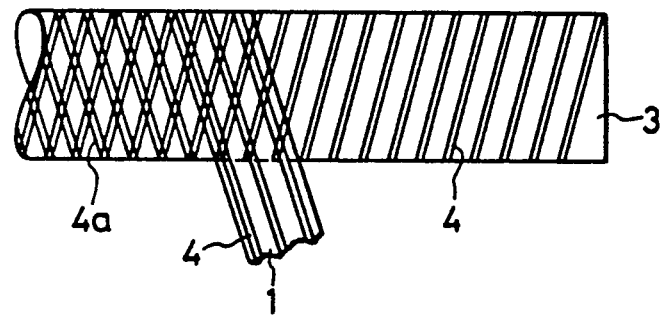

If the amorphous metal long fiber tape 4 is wound in the conventional cross winding method, it may be twisted. For the purpose of eliminating this difficulty, in the invention the amorphous long fiber tape 4 is wound as follows. The tape 4 is spirally would on the tube from its right end to the left end and then from the left end to the right end in such a manner that the tape 4 thus wound forms a double layer, namely, an X line winding 4 as shown in FIG. 8.

One side or both sides of the amorphous metal long fiber tape 4 is subjected to shot blasting, liquid honing or metal plating, as was described above. The shot blasting or liquid honing may be carried out after the amorphous metal long fiber tape has been wound on the metal core or the tube. The metal plating may be performed either after or before the amorphous long fiber tape is wound on it. In this connection, it should be noted that one or both sides of the amorphous metal long fiber tape 4 may be subjected to shot blasting, liquid honing and/or metal plating. In the latter amorphous metal long fiber tape treating method, examples of the metal plating material employed are copper, nickel, tin, zinc and gold.

Amorphous metals and alloys and methods for their production are well known, and various compositional types of amorphous metals and alloys may be selected for use in the present invention. Also, methods for producing long strips, tapes, filaments, fibers, or the like thereof are well known.

A typical example of the amorphous metal long fiber tape 4 is 5 to 20 $\mu$ in thickness (t) and 0.1 to 2.5 mm in width (w).

Figure 6:
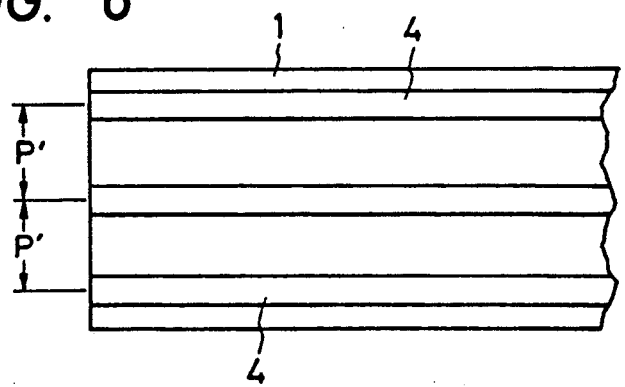
FIG. 6 is a plan view of a prepreg sheet to which a plurality of amorphous long fiber tapes are bonded.

The method of forming the tubular structure having two or three amorphous long fiber layers 5 may be modified as follows: As shown in FIG. 6, a plurality of amorphous metal long fiber tapes 4 are bonded to a prepreg sheet 1 in such a manner that they are extended in parallel with one another and positioned at intervals of P', to form a tape assembly. The tape assembly is spirally wound on the metal core 2 to form two or three layers thereon, thereby to form a tubular structure. When necessary, the tubular structure is subjected to protective coating. Furthermore, a film-shaped prepreg sheet (not shown) is wound on the tape assembly wound thereon, and is thermally set by the conventional method to make the amorphous long fiber layer 5 integral with the prepreg sheet 1, so that a tubular structure is formed.

Figure 7:
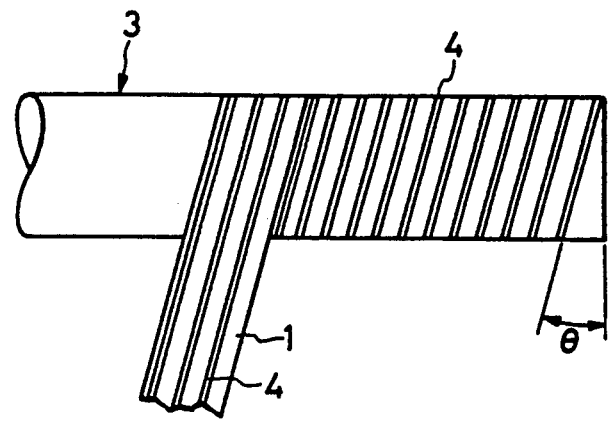
FIGS. 7 and 8 are front views showing two examples of a method of winding an amorphous long fiber tape.

The winding pitch P of the amorphous metal long fiber 4 is not limited; however, from the physical point of view it is preferable that the spirally or crosswise winding angle $\theta$ is 15° or less with respect to a plane perpendicular to the longitudinal axis of the metal core 2 or the tube 3 as shown in FIG. 7.

Figure 9:
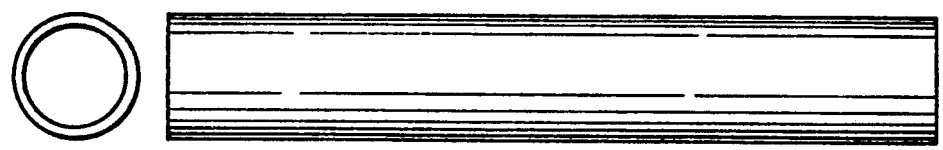
FIGS. 9 and 10 are front views showing tubular structure specimens.
Figure 10:
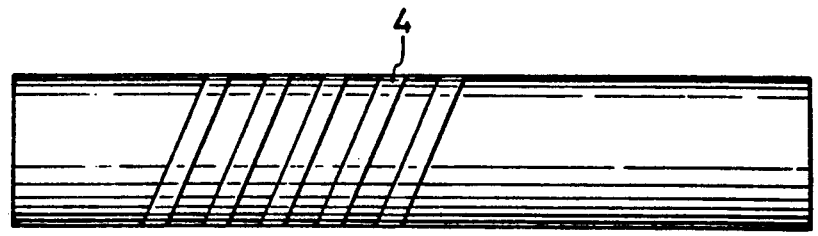

Tubular structures were formed as specimens I, II, and III as shown in FIG. 9 and 10, and subjected to bending strength tests as described below.

Specimen I

Specimen I is a four layer carbon tubular structure having dimensions as shown in FIG. 9.

Specimen II

Specimen II is a tubular structure which is formed by spirally winding a linear amorphous metal tape (70 $\phi\mu$) at a pitch of 4 mm under a tension of 500 g as shown in FIG. 10.

Specimen III

Specimen III is a tubular structure which is formed by winding an amorphous metal long fiber tape (0.38 mm in width, and 15 in thickness) on specimen I in the same manner as specimen II.

Test Method

Figure 11:
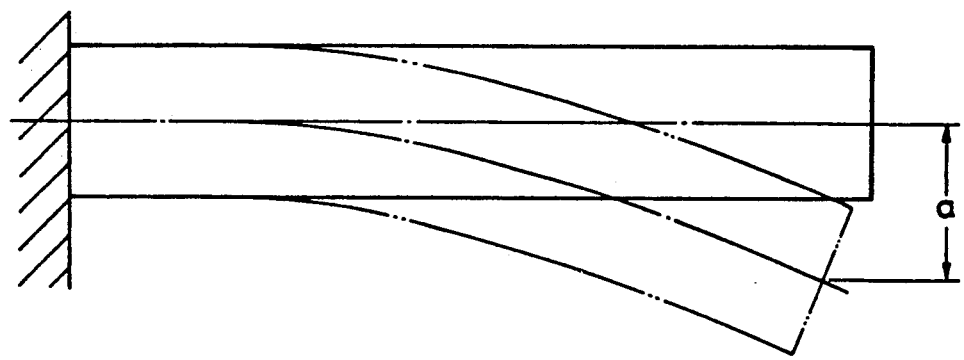
FIG. 11 is an explanatory diagram showing a method of measuring the deflection of each of the tubular structure specimens.

As shown in FIG. 11, each of the specimens I, II and III was cantilevered, and weighted with a load of 750 g at a span of 1000 mm. Under this condition, its deflection a was measured. The results of the tests are as listed below:

|  | 1st test | 2nd test | Average |
|---|---|---|---|
| Specimen I | 67.6 | 67.5 | 67.5 |
| Specimen II | 67.5 | 67.5 | 67.5 |
| Specimen III | 65.4 | 65.2 | 65.3 (Unit: cm) |

As is apparent from the above table, specimen III using the amorphous metal long fiber tape is smaller in deflection (a) than specimens I and II using the convention materials; that is, employment of the amorphous metal long fiber tape can improve the bending strength of the tubular structure.

In the tubular structure of the invention, the amorphous metal long fiber tapes 4 are in surface contact with the prepreg sheets 1 forming the tube 3, and therefore the load is distributed over the tubular structure and the stress is also dispersed. Accordingly, the winding tension can be increased, that is, the adhesion strength of the prepreg sheet 1 and the amorphous metal long fiber tape 4 can be increased.

Furthermore, in the tubular structure of the invention, the amorphous metal long fiber tape 4 is continuously spirally or crosswise wound with a given pitch P so that the tape non-wound regions having a width corresponding to the pitch P are provided between the amorphous long fiber layers 5; that is, the amorphous long fiber layer 5 is held between the inner and outer layers 3a and 3b of the tube 3. Therefore, at each of the tape non-wound regions, the inner and outer layers 3a and 3b and the middle layer 3c are joined together, that is, the adhesion of the layers is improved. Accordingly, the layers are prevented from being peeled off from one another, and the twisting strength, collapsing strength and bending strength are improved.

Furthermore, the amorphous metal long fiber tape 4 is in the form of a belt. Therefore, it can be uniformly wound on the prepreg sheet 1 when compared with the conventional linear amorphous fiber tape. Therefore, the tubular structure formed is stable in mechanical strength, and in the manufacture of fishing rods, they can be well balanced in strength merely by adjusting the pitch P of the amorphous metal long fiber tape 4.

In addition, the amorphous metal long fiber tape is wound with a given pitch P, as was described above. This will contribute to the economical use of the amorphous metal long fiber tape, and the improvement in mechanical strength and the reduction in weight and manufacturing cost of the tubular structure.

What is claimed is:

1. A multilayered tubular structure for manufacturing for instance fishing rods comprising:
    a tube formed of a prepregnated sheet; and
    an amorphous long fiber layer formed on a belt of an amorphous metal long fiber tape having at least one side thereof roughened and being continuously wound on said tube along the length thereof at a predetermined pitch without overlapping adjacent turns to provide a continuous surface contact with said prepregnated sheet so that said amorphous long fiber tape and said prepregnated sheet are joined together with high adherence and define a winding angle in a spiral or crosswise configuration.

2. A multilayer tubular structure as claimed in claim 1, in which said amorphous long fiber tape is wound on the inner wall of said tube.

3. The multilayered tubular structure according to claim 1, wherein said amorphous long fiber tape is wound on the outer wall of said tube.

4. A multilayered tubular structure as claimed in claim 1, in which said amorphous long fiber tape is wound on the inner and outer walls of said tube.

5. A multilayered tubular structure as claimed in claim 1, in which said tube is formed of a plurality of prepregnated sheet layers, and said amorphous long fiber tape is wound along said tube between said prepregnated sheet layers.

6. A multilayered tubular structure as claimed in claim 1, in which said tube is formed by winding said prepregnated sheet in such manner as to form a plurality of prepreg sheet layers, and said amorphous long fiber tape is wound in such manner that said amorphous long; fiber layer is formed on each of said plurality of prepregnated sheet layers.

7. A multilayered tubular structure as claimed in claim 1, in which said amorphous long fiber tape is formed in such a manner that a plurality of amorphous long fiber tapes extending in parallel with one another are bonded to a prepregnated sheet.

8. The multilayered tubular structure according to claim 1, wherein said winding angle measured with respect to a plane perpendicular to the longitudinal axis of said tube is not greater than 15°.

9. The multilayered tubular structure according to claim 1, wherein said amorphous long fiber tape has an inner face disposed toward said tube, said inner face of said amorphous long fiber tape being roughened.

* * * * *

UNITED STATES PATENT AND TRADEMARK OFFICE
CERTIFICATE OF CORRECTION

PATENT NO. : 5,188,152
DATED : February 23, 1993
INVENTOR(S) : Kazunoba Ogawa

It is certified that error appears in the above-indentified patent and that said Letters Patent is hereby corrected as shown below:

Claim 6, column 6, line 36, change "prepreg" to --prepregnated--.

Signed and Sealed this

Eighth Day of February, 1994

Attest:

BRUCE LEHMAN

Attesting Officer     Commissioner of Patents and Trademarks